July 31, 1962 C. G. MATSON 3,047,169
RAILROAD CAR VIBRATOR
Filed Feb. 12, 1959 5 Sheets-Sheet 1
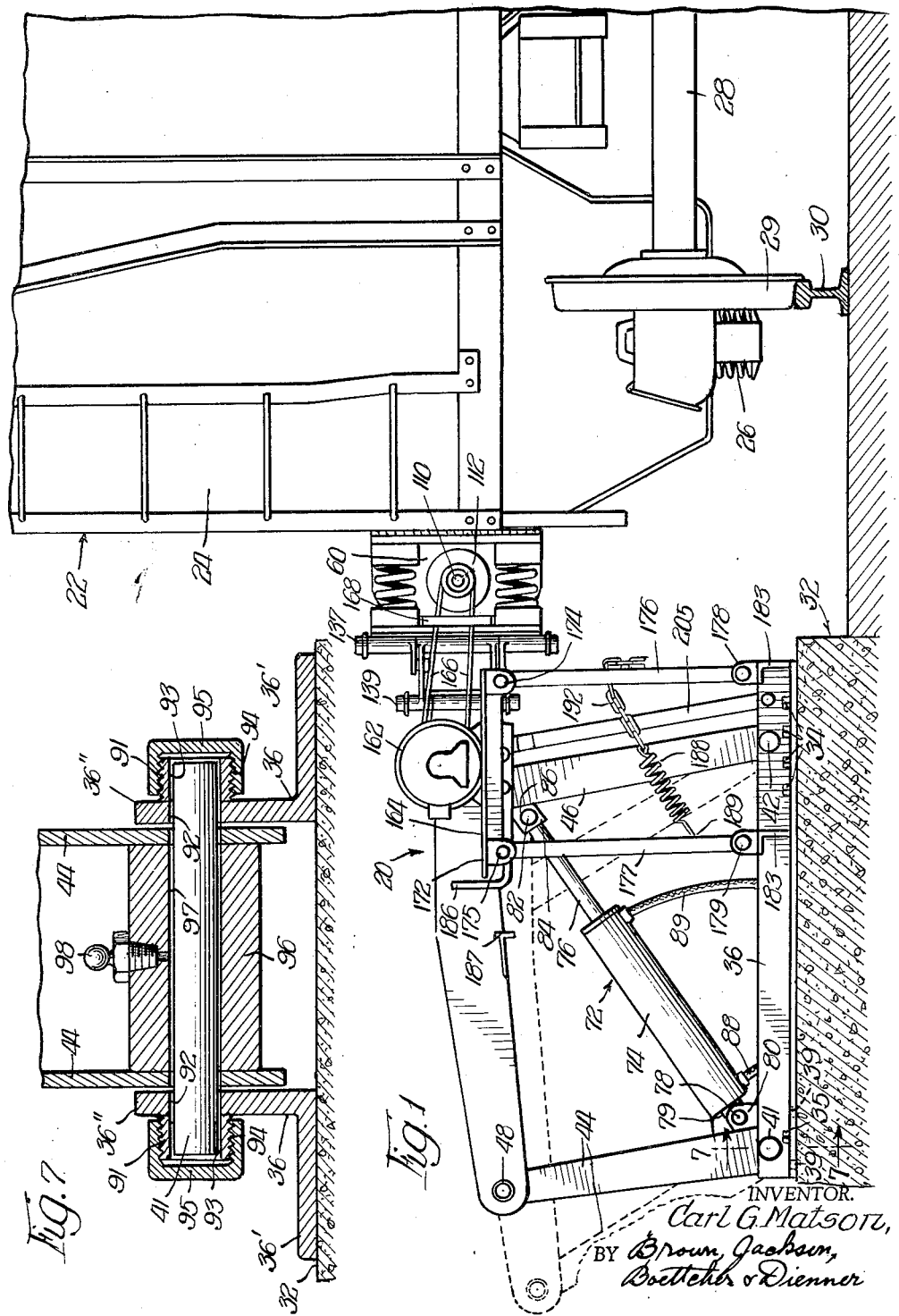
INVENTOR.
Carl G. Matson,
BY Brown, Jackson,
Boettcher & Dienner July 31, 1962
C. G. MATSON
3,047,169
RAILROAD CAR VIBRATOR
Filed Feb. 12, 1959
5 Sheets-Sheet 2
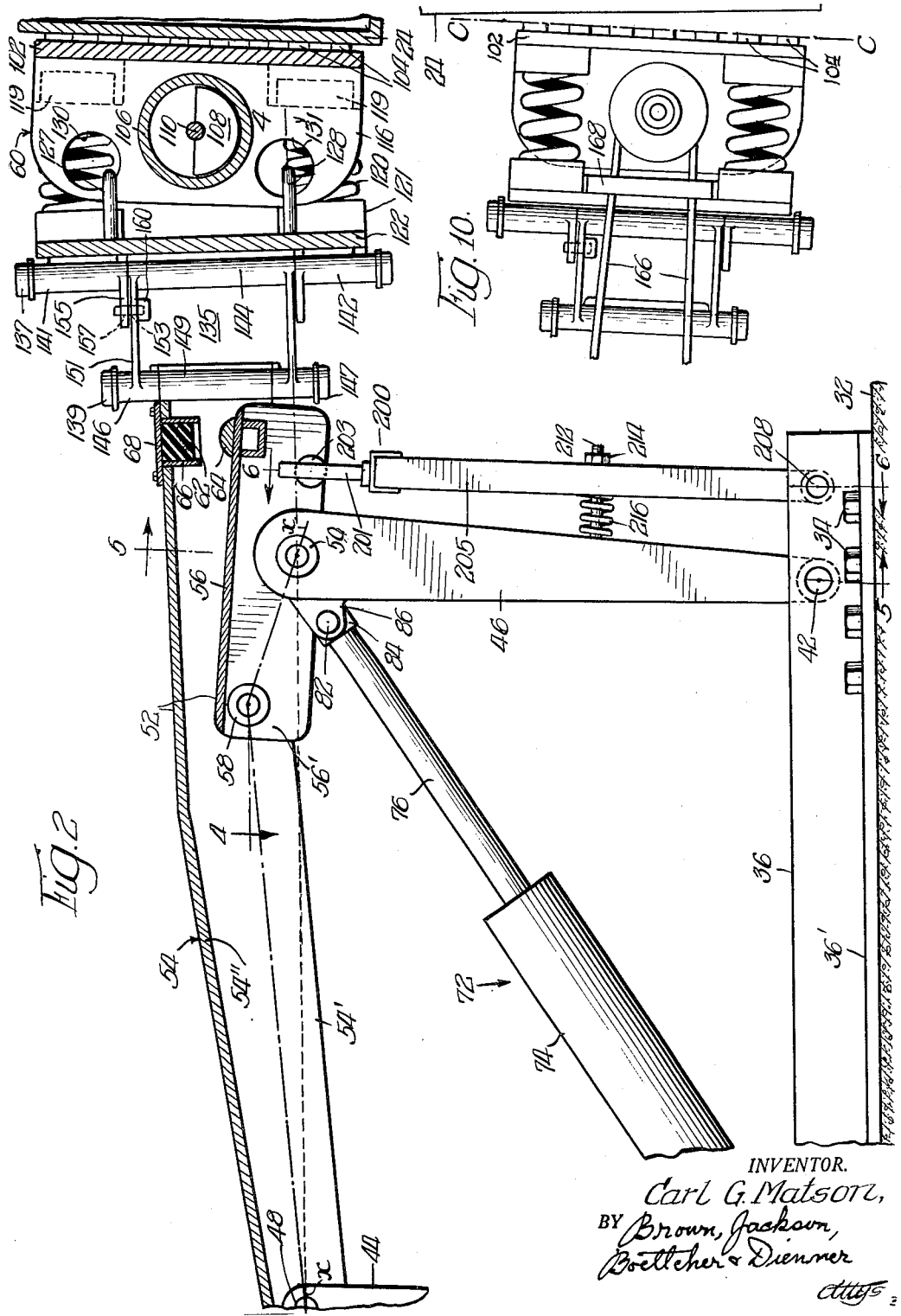
INVENTOR.
Carl G. Matson,
BY Brown, Jackson,
Boettcher & Diemer
Attys.

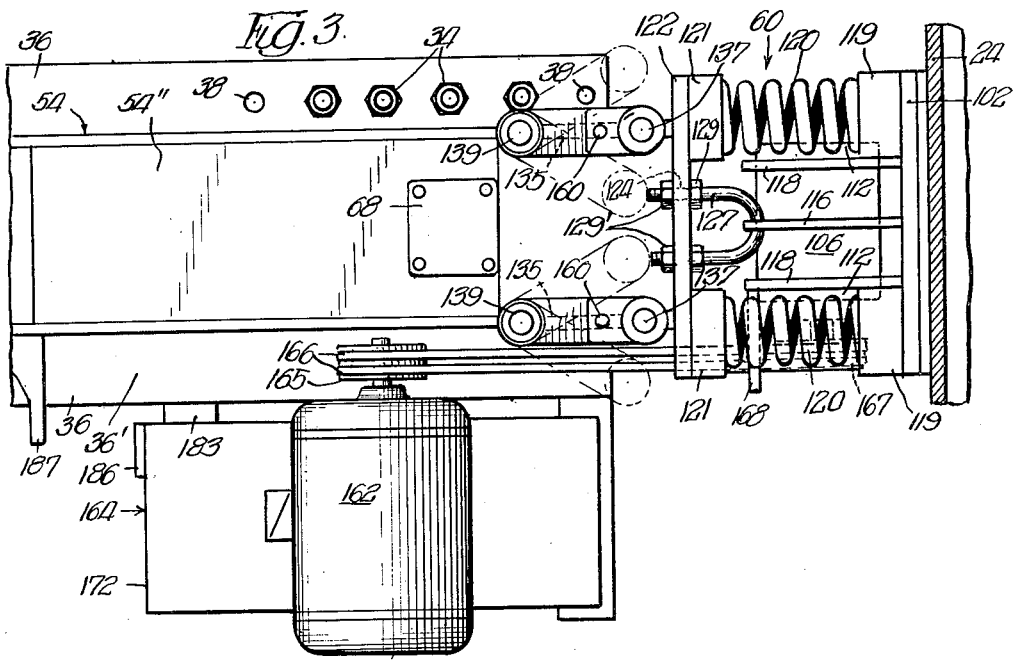
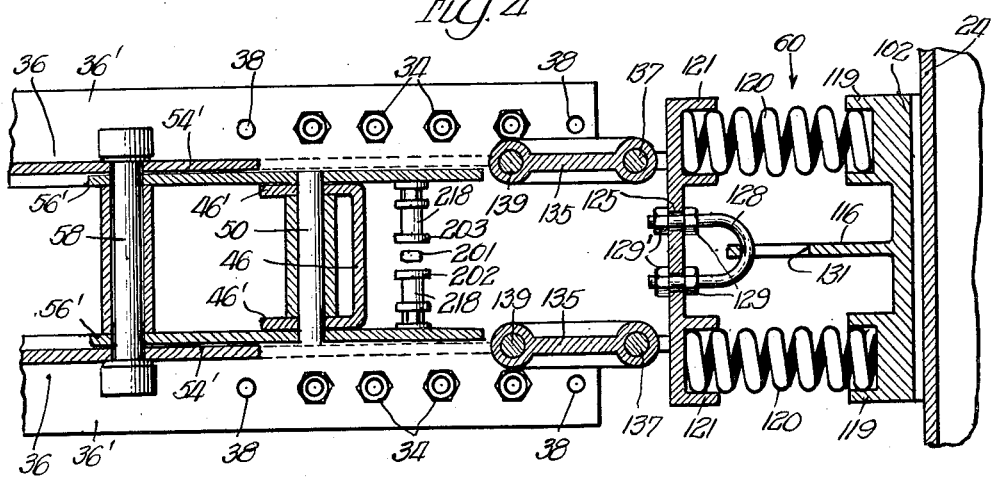
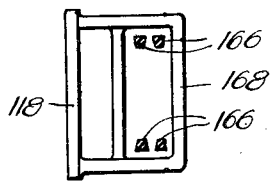

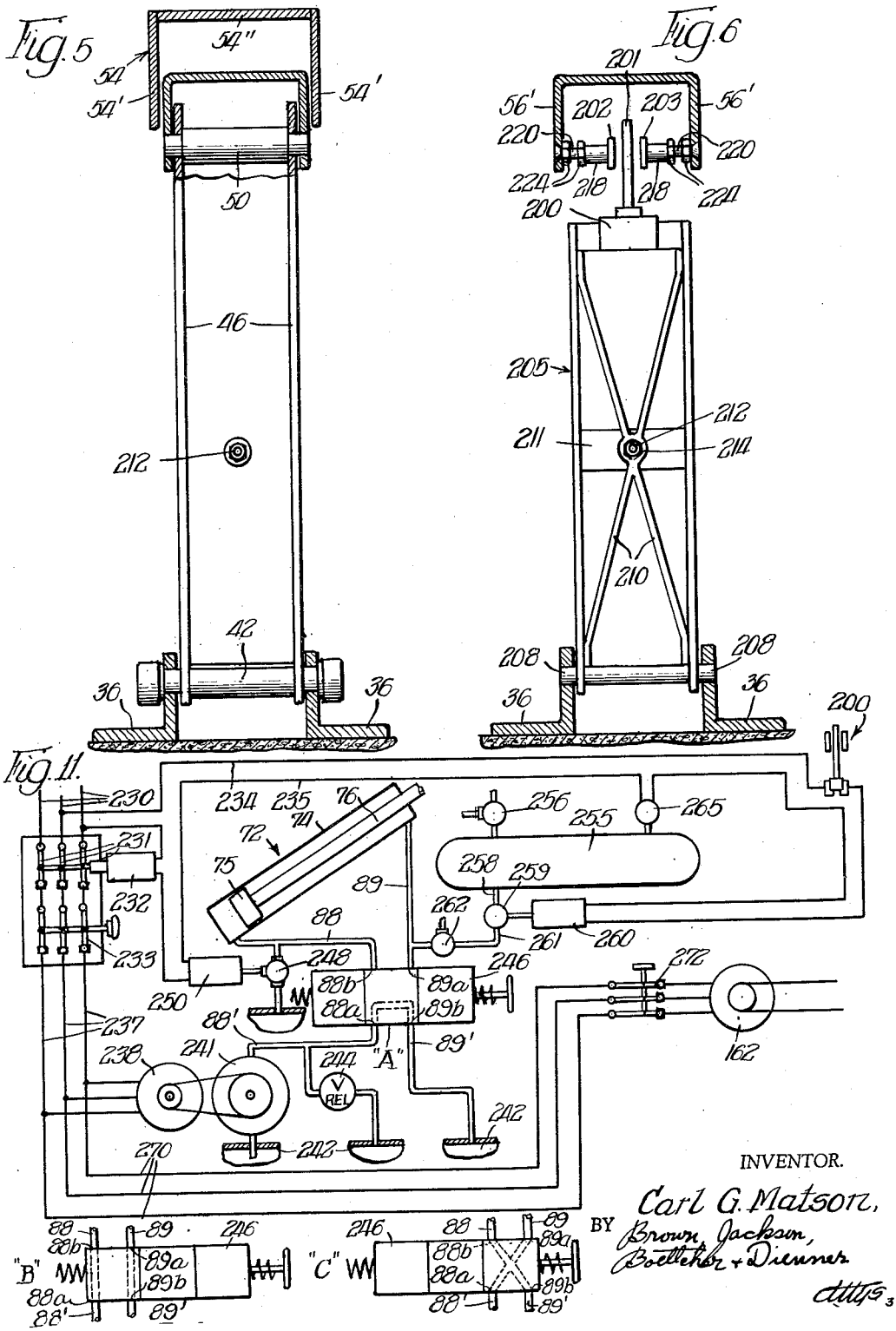

July 31, 1962 C. G. MATSON 3,047,169
RAILROAD CAR VIBRATOR
Filed Feb. 12, 1959 5 Sheets-Sheet 5
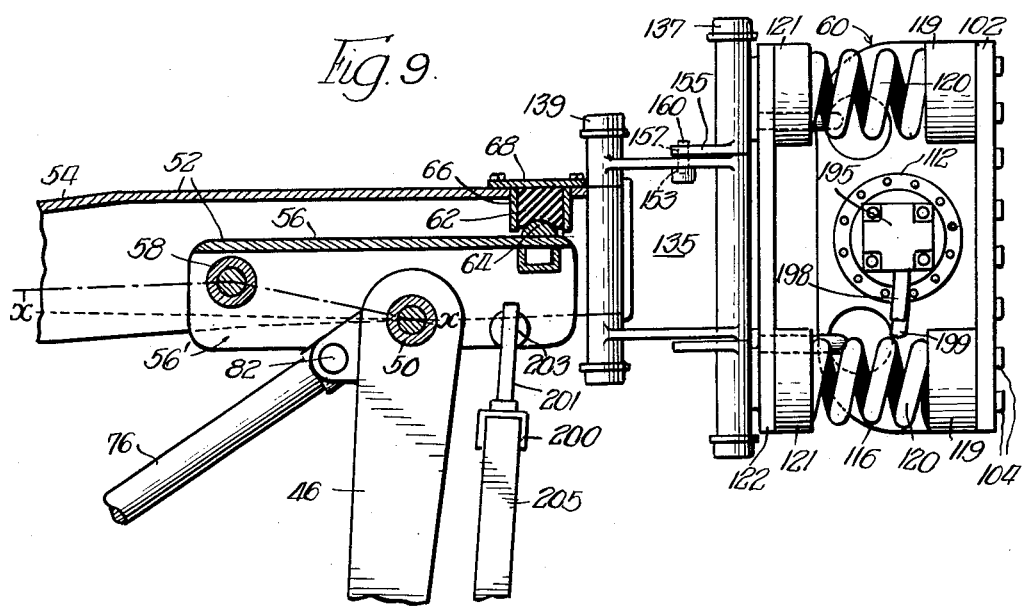
Fig. 9.
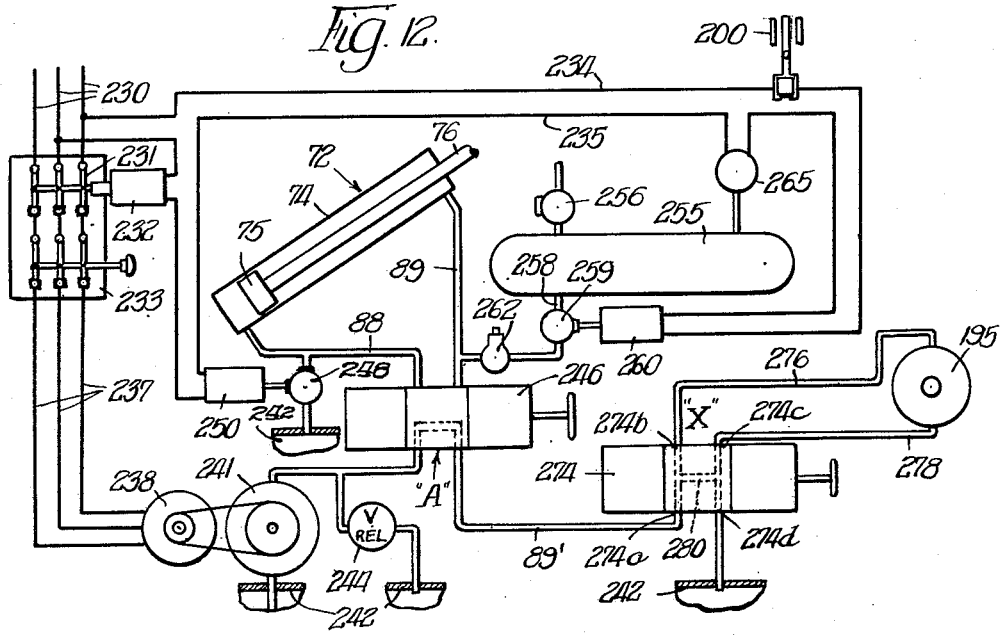
Fig. 12.
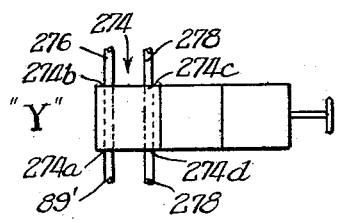
INVENTOR.
Carl G. Matson,
BY Brown, Jackson,
Boettcher & Dienner
Attys

United States Patent Office 3,047,169
Patented July 31, 1962

3,047,169
RAILROAD CAR VIBRATOR
Carl G. Matson, Kewanee, Ill., assignor to Vibrator Manufacturing Company, Neponset, Ill., a corporation of Illinois
Filed Feb. 12, 1959, Ser. No. 792,850
23 Claims. (Cl. 214—64.2)

The present invention relates to vibrators adapted to be used in connection with railroad dump cars of the hopper or bottom dump types, for the purpose of facilitating and accelerating the dumping of the load therefrom. These dump cars are used generally for the transport of loose material such as coal, ore, stone, sand, and the like, and such contents frequently become packed, jammed or frozen so that gravitational dumping through the hopper bottom will not occur, or only occurs in limited quantities. Under such circumstances, the prevalent practice is to place one or more men in the dump car with appropriate tools, who laboriously spend much time loosening the material for discharge through the hopper door openings, or shoveling the piles of material into the hopper door openings. Dump car vibrators are intended to obviate this labor and expense, and also to greatly accelerate the dumping of the load so that the time of the dump car spent at the dumping site is substantially reduced.

The present invention relates to a dump car vibrator which has anchored mounting alongside the railroad track at the dumping site, and which has the vibrator head supported entirely on a movable carrier or linkage system which enables the vibrator head to be quickly moved into and out of engagement with the side of the car body. Such movement of the vibrator head is effected by a two-way hydraulic ram which is capable of causing the vibrator head to be forced into contact with the side of the car body under extremely large pressures—preferably of the order of 25,000 pounds or more—which large pressures increase the effectiveness with which the vibratory pulses are transmitted from the vibratory head to the car body. This anchored mounting of the vibrator mechanism is preferably on a concrete implacement or other rigid anchorage alongside the railroad track, separate from the dump car itself, which anchored mounting is capable of withstanding the above described large reaction pressures of the hydraulic ram forcing the vibrator head against the side of the car body, and is also capable of withstanding the reaction of the vibratory stresses set up by the vibrator head against the car body.

Prior constructions of dump car vibrators which had to be manually moved into car engaging position; or which had to be manually hooked onto the side of the car; or which had to have anchored attachment established to the car frame in order to sustain reaction stresses, have been objectionable from the standpoint of requiring excessive manual labor, and excessive time consumption in getting the vibrator into operative engagement with the car and thereafter getting it separated therefrom. For example, some of these prior vibrator devices are so cumbersome and heavy as to require the strenuous efforts of two or three men to engage the vibrator with the car and to release it therefrom after the dumping of the load. This is avoided by my improved vibrator, which has its entire weight mounted on a swinging linkage system, and is swung into engagement with the car body under the aforesaid extremely large pressures, and is thereafter swung out of engagement with the car body, all through the operation of the hydraulic ram. By obviating the necessity of having to manually lift and mount the car vibrator on the car, I can construct my vibrator assembly to be much heavier and with a more powerful vibrator driving motor than in portable types, whereby the rate of dumping from the car can be greatly increased. My improved construction also avoids the necessity of any overhead supporting structure for supporting or suspending the car vibrator, and also avoids the necessity of any auxiliary set of tracks or any smooth graded road surface alongside the dump car for rolling the car vibrator into car dumping position on a wheeled truck.

One of the more particular objects of the invention is to provide an improved movable mounting arrangement for the vibrator head which, during the dumping operation, will permit upward movement of the vibrator head, more or less concurrently with the upward movement of that side of the car body with which the vibrator head is then engaging; but which will nevertheless exert, simultaneously therewith, a large downward force component on the vibrator head tending to resist or reduce such upward movement of the car body. This upward movement of the car body occurring during the dumping operation is caused by two forces or factors.

One is the lateral tilting or heeling of the car body in its spring mounting on the truck frames, this tilting being in a direction away from the vibrator mechanism, in consequence of the very large thrusting force with which the hydraulic ram is pushing the vibrator head in a substantially horizontal direction against the side of the car body. As the car body tilts about its spring mounting on the truck frames in response to this sidewise thrust, that side of the car body which is receiving the sidewise thrust tilts upwardly. The angle of this sidewise tilt continues to increase with the lightening of the load through dumping.

Another factor which causes upward movement of the car body during the dumping operation, arises from its leaf spring and coil spring mounting on the truck frames, this spring mounting tending to push the car body upwardly as the weight of the contained load is being gradually reduced during the dumping operation.

The maintenance of the downwardly acting force component in the vibrator head while it is being thrust laterally against the side of the car body, has the advantage of preventing creepage or slipping of the vibrator head in an upward direction along the side wall of the car body, particularly while this side wall is heeling or tilting away at an upwardly sloping angle. Still further, the maintenance of this downwardly acting force component in the vibrator head is also advantageous in opposing and reducing the upward movement of the car body during the dumping operation. The downwardly acting force component is obtained by a unique relation of toggle linkage constituting the upper leg of a quadrangular system of pivoted links which carries the vibrator head into and out of engagement with the dump car; the thrusting force of the hydraulic ram being transmitted through this toggle linkage and creating the downward force component by tending to force the toggle linkage into a dead center or straight line relationship.

Another object of the invention is to provide improved safety release mechanism which will automatically release the vibrator head from pressure engagement against the side of the car if the car should accidentally start moving along its rails while the vibrator head still remains clamped against the side of the car during the performance of the dumping operation, or before the attendant has manually caused the vibrator head to be withdrawn from engagement with the side of the car after the conclusion of the dumping operation. This safety release mechanism is provided to take care of the possible contingency of a careless locomotive engineer or other negligent train attendant starting the dump car rolling along the rails while the vibrator head still remains clamped to the side of the car under the heavy thrusting pressure of the hydraulic ram. In the absence of such safety release mechanism, this inadvertent rolling motion of the car could distort and twist the power linkage mounting of the vibrator head.

One embodiment of this safety release mechanism comprises two horizontally swinging parallel link plates which are interposed between the vibrator head and the power linkage mounting. These parallel link plates are normally held against horizontal swinging motion by shear pins or shear bolts. If the car should inadvertently start to roll while the vibrator head was in pressure engagement therewith, these shear pins would shear and permit the parallel link plates to swing horizontally so as to carry the vibrator head out of engagement with the side of the car, thereby avoiding the aforementioned distortion or twisting of the vibrator head mounting.

Another embodiment of this safety release mechanism is electrically triggered into operation by electrical switch means which immediately responds to sidewise distortion pressure created in the initial rolling motion of the dump car. This response of the triggering switch operates through a control circuit to cause an immediate forced withdrawal of the vibrator head from the side of the car under the action of power mechanism.

Both of the above embodiments of safety release mechanism can be utilized together in the same installation where the utmost degree of safeguarding is desired, or either one of these embodiments of safety release mechanism can be employed alone.

In one embodiment of the invention, the power drive for driving the rotating shaft of the vibrator head is transmitted from an auxiliary electric motor through a driving belt; and, in this regard, another object of the invention is to provide an improved swinging link mounting frame for this auxiliary electric motor which substantially isolates the electric motor from the vibratory stresses and shock set up in the vibrator head. This swinging link motor mounting frame swings forwardly and rearwardly concurrently with the forward and rearward movement of the vibrator head into and out of engagement with the car; and a unique spring arrangement acts on such frame to establish driving tension in the driving belt when the frame is in its forward position, and to relax this tension in the driving belt when the frame is in its rearward position.

In another embodiment of the invention, I have shown the power drive to the rotating shaft of the vibrator head as being effected by an improved arrangement of hydraulic motor having direct mounting on the vibrator head.

Another object of the invention is to provide an improved spring mounting of the vibrator head on the hydraulically actuated beam structure which moves the vibrator head into and out of engagement with the side of the car. This improved spring mounting yieldingly transmits the full hydraulic pressure which forces the vibrator head against the side of the car, while still permitting vertical and horizontal cocking movement of the vibrator head to accommodate the lateral tilting or heeling of the car occurring during the dumping operation. This improved spring mounting also functions as a cushioning support for reducing the transmission of vibratory reaction stresses to the hydraulically actuated mounting linkage.

Other objects, features and advantages of the invention will appear from the following detail description of certain preferred embodiments of the invention. In the accompanying drawings illustrating such embodiments:

FIGURE 1 fragmentarily illustrates in end elevation, a typical railroad dump car, and also illustrates in side elevation one embodiment of my improved car vibrator with the vibrator head moved into position against the side of the dump car.

FIGURE 2 is a fragmentary longitudinal sectional view through the vibrator head and its swinging link mounting, illustrating the toggle link action as the car body tilts or heels laterally during the dumping operation.

FIGURE 3 is a fragmentary plan view of the vibrator head and the adjacent portion of the supporting linkage system.

FIGURE 4 is a horizontal sectional view taken approximately on the plane of the line 4—4 of FIGURE 2.

FIGURE 5 is a substantially vertical transverse sectional view taken approximately on the plane of the line 5—5 of FIGURE 2.

FIGURE 6 is a substantially vertical transverse sectional view taken approximately on the plane of the line 6—6 of FIGURE 2.

FIGURE 7 is a transverse sectional view of one of the main linkage pivots, on a larger scale, corresponding substantially to a section taken on the plane of the line 7—7 of FIGURE 1.

FIGURE 8 is a fragmentary detail view showing the belt guiding frame which guides the belt or belts from the electric motor to the rotating shaft of the vibrator head.

FIGURE 9 is a fragmentary sectional view through the hydraulically actuated mounting linkage, similar to FIGURE 2 but illustrating the position of the parts when the vibrator head is out of engagement with the car body or has just initially engaged the car body; this figure also illustrating the direct mounted hydraulic motor drive of the vibrator head;

FIGURE 10 is a fragmentary side elevational view of another embodiment in which the vibrator head is given a normal or original downward cant at an angle to compensate for the tilting or heeling angle which the car body assumes during the dumping operation.

FIGURE 11 is a schematic diagram showing the electrical circuit connections, the hydraulic liquid connections, and the compressed air connections in that embodiment of the invention characterized by the electrically triggered automatic withdrawing mechanism and also characterized by the auxiliary motor belt drive to the vibrator shaft; and FIGURE 12 is a schematic diagram similar to FIGURE 9 but showing the modified hydraulic liquid connections for that embodiment utilizing the aforesaid direct mounted hydraulic motor drive of the vibrator shaft.

In FIGURE 1 I have shown my improved car vibrator, designated 20 in its entirety, in operative position against the side of a railroad dump car 22. This car 22 is intended to represent any typical railroad dump car having a hopper bottom or any other conventional arrangement of dumping doors. The body 24 of the car has the conventional spring mounting on the wheeled trucks, such as by leaf springs and coil springs, the latter being indicated at 26. The wheeled trucks comprise conventional truck axles 28 and truck wheels 29 which roll along the railroad tracks or rails 30. The above described spring mounting of the car body 24 on the wheeled trucks permits the body 24 to tilt or heel laterally in a direction away from the vibrator 20 under the very large sidewise pressure which the vibrator head exerts against the side of the car under the action of a hydraulic ram, as will be later described; and this spring mounting of the body 24 also causes the body to move upwardly through a substantial distance as the contents or lading contained within the body 24 is progressively dumped from the body. My improved vibrator embodies mechanism which automatically compensates for this lateral heeling and upward lifting of the car body, as will be later described.

The vibrator 20 has anchored mounting at any location along the track-way 30 where it is desired to have the dumping occur. This anchored mounting may consist of a bolted attachment to the top surface of a concrete base 32 of substantial size, set into the ground; or the anchorage may have attachment to the stationary structure of the below-ground conveyor mechanism for conveying the dumped lading away from the dumping pit beneath the dump car, such as to the fabricated steel structure or the concrete structure of this conveyor mechanism. Still further, the stationary anchorage may, if desired, have attachment to one or both of the railroad rails 30. In the exemplary embodiment showing the mounting as being upon the concrete base 32, this base has inner and outer sets of stud bolts 34 and 35 anchored therein and extending upwardly therefrom. The base structure of the vibrator comprises two spaced bars 36, preferably of angle cross section, having their horizontal outwardly extending flanges 36' adapted to be fastened down over the stud bolts 34 and 35. There are preferably a plurality of equally spaced stud bolts 34 in each inner set, to increase the rigidity of anchorage where the stress is greatest, and only one or two stud bolts in each outer set 35. The base flanges 36' of the angle bars 36 have inner sets of holes 38 for receiving the inner stud bolts 34 and have outer sets of holes 39 for receiving the outer stud bolts 35, these holes being sufficient in number and equally spaced so that in the mounting of the vibrator the base angle bars 36 may be set down in different inwardly or outwardly shifted positions either closer to or further away from the rails 30, whenever inward or outward adjustment of the vibrator is desirable.

Extending transversely through the upright flanges 36" of the base angle bars 36, adjacent to their outer ends, is a stationary outer pivot pin 41, and extending transversely through these flanges in close proximity to their inner ends is a stationary inner pivot pin 42. Pivotally mounted on the outer pivot pin 41, between the base angles 36, is a pair of upwardly extending outer link arms 44, and pivotally mounted on the inner pivot pin 42 between the base angles, is a pair of upwardly extending inner link arms 46. The upper ends of the outer link arms 44 carry a pivot pin 48 extending transversely therethrough, and the upper ends of the inner link arms 46 carry a pivot pin 50 extending transversely therethrough.

Extending substantially horizontally between these outer and inner pivot pins 48 and 50 is a toggle link assembly 52. This toggle link assembly comprises outer and inner toggle links 54 and 56 which are pivotally connected together by a transversely extending toggle pivot 58. The outer toggle link 54 is in the form of a relatively long channel shaped beam having depending side flanges 54', the rear end of said beam having the outer transverse pivot pin 48 passing between these side flanges 54' and the front end of the beam extending beyond the inner toggle link 56 and carrying the vibrator head 60 at its inner end, as will be presently described. The upwardly extending outer and inner link arms 44 and 46 may also be formed of channel cross section, each having an integral transverse web extending between the spaced pairs of side arms 44 and 46. The inner toggle link 56 also comprises a pair of spaced side plates, or is of channel cross section, and is mounted for swinging movement around the pivots 50 and 58 between the depending side flanges 54' of the outer toggle link 54. The downward folding motion of the toggle assembly around the toggle pivot 58 is limited by cooperating abutment stops 62 and 64, mounted on the inner portions of the toggle links 54 and 56. The upper stop 62 comprises a cushioning block of rubber, or other elastomeric material, confined within an open bottom box 66 which extends down through the web of the channel link 54 and is covered over by cover plate 68. The lower abutment stop 64 is shown as being in the form of a knob which is supported on a transverse channel box 70 extending between the side plates of the inner toggle link 56, this knob being adapted to have abutment engagement against the block of rubber 62. These two cushioning stops 62 and 64 come into abutment before the toggle pivot 58 can move downwardly into dead center alignment between the two upper swinging pivots 48 and 50, the line denoting such dead-center alignment being indicated in dotted lines at x—x in FIGURE 2. Thus, these limiting stops permit free upward folding motion of the outer and inner toggle links 54 and 56 around the toggle pivot 58, but limit downward folding motion around the toggle pivot 58 to a point substantially above the dead-center line x—x.

Extending diagonally upwardly from the outer end of the base frame structure 36 to the upper ends of the inner link arms 46 is a two-way hydraulic ram 72 comprising a cylinder 74 in which reciprocates a piston 75 and piston rod 76. The lower end of the cylinder has pivotal mounting on a transverse pivot pin 78 which passes through a pivot lug 79 projecting from the lower end of the cylinder and also through two spaced pivot lugs 80 formed as a part of the outer link arm structure 44. The upper end of the piston rod 76 has pivotal mounting on a transverse pivot pin 82 which passes through a piston rod collar 84 and through spaced pivot lugs 86 formed as a part of the inner link arm structure 46. The extension and retraction of the hydraulic ram 72 is effected by admitting hydraulic pressure selectively into the lower and upper ends of the cylinder through flexible hoses 88 and 89. Before describing the operation of the quadrangular system of links and the toggle mechanism 54, 56, 58, I wish to first describe the construction of the linkage pivots.

The several pivots 41, 42, 48, 50, 58, 78 and 82 in the quadrangular system of links are subjected to very intensive vibratory stresses when the vibratory head 60 is vibrating against the side of the car. Conventional constructions of these pivots are not capable of withstanding such vibratory stresses for any length of time. In FIGURE 7 I have shown a transverse section, on an enlarged scale, of an improved construction of pivot which has proven to be capable of accommodating such vibratory stresses. FIGURE 7 illustrates pivot 41, from which it will be seen that it comprises two short nipples 91, 91 welded to the outer sides of the upright angle flanges 36", 36" in line with pivot holes 92, 92 passing therethrough, the bores 93 of the nipples being of substantially the same diameter as the pivot holes 92. The outer ends of the nipples have pipe threads 94, 94 over which screw pipe closure caps 95, 95. The two spaced link arms 44, 44 have a transverse bearing boss 96 welded therebetween which has a bore 97 of substantially the same diameter as the pivot holes 92 and bores 93. The pivot pin 41 has quite a loose rotative fit within the pivot holes 92 and bores 93 and 97. A lubricating fitting 98 projecting from the boss 96 enables all of the intrevening space between the pivot pin and the pivot holes and bores to be filled with heavy lubricant. The loose rotative fit of the pivot pin 41 results in the pin rotating throughout the entire vibratory period, so that the pin constantly presents new peripheral surfaces to the lines of shear transmitted through the bearing assembly. This construction of pivot has proven to be capable of withstanding the large shear stresses set up by the extension of the hydraulic ram 72, and also the very destructive vibratory stresses set up by the vibratory head 60. As above remarked, substantially this same construction is used at each of the other pivots 42, 48, 50, 58, 78 and 82, which are likewise subjected to substantially the same stresses, to a greater or less degree.

Referring now briefly to the operation of the quadrangular system of linkage, and to the function of the toggle link arrangement 54, 56, 58, when the vibratory head 60 is in the normal retracted position of the linkage system as shown in dotted lines in FIGURE 1, and when the vibratory head is just beginning to engage the side of the car, as shown in full lines in FIGURES 1 and 10, the toggle pivot 58 occupies substantially the relative position shown in FIGURE 10, appreciably above the dead-center line x—x. In this position the cushioning stops 62—64 are supporting the overhanging weight of the vibratory head 60. When the vibratory head and supporting linkage are in fully retracted position, shown in dotted lines in FIGURE 1, the admission of hydraulic pressure through hose 88 to the lower end of the cylinder causes the outer and inner link arms 44 and 46 of the quadrangular linkage system to swing substantially as a pair of parallel links for moving the upper toggle beam structure 52 toward the railroad car, thereby bringing the vibratory head 60 into initial engagement against the side of the car. As the inward pressure exerted by the ram 72 against the inner toggle supporting pivot 50 increases, an increasing toggle straightening force tends to urge the toggle pivot 58 in a direction down toward dead-center alignment with the two end pivots 48 and 50, which position it cannot reach, however, because of the abutment of the cushioning stops 62, 64. Such downward force exerted on the toggle pivot 58 operates through the beam structure 54 to create a downward component of force on the vibratory head 60, concurrently with the endwise component of force which is forcing the vibratory head into heavy pressure engagement against the side wall of the car. This downward component of force exerted on the vibratory head 60 is in opposition to the upward component of force which the car body 24 starts transmitting to the vibratory head 60 progressively with the dumping operation. One factor creating this upward component of force in the car body arises from the lateral tilting or heeling of the body under the large sidewise pressure which is hydraulically exerted through the vibratory head, which lateral tilting continues to increase with the discharging of the load. Another factor creating this upward force component in the car body arises from the action of the truck leaf springs and coil springs 26 forcing the body upwardly as the lading is discharged. Such upward force component occurring in the car body 24 is illustrated in FIGURE 2, which shows the left side of the car body tilted or heeled over at an upward angle of inclination, owing to the large lateral pressure which the vibratory head 60 is exerting against the side of the body under the action of the hydraulic ram 72. As previously described, this tilting of the car body increases as the weight of the lading is discharged therefrom. FIGURE 2 also illustrates the additional upward force component which arises in the car body 24 under the action of the car springs (such as the leaf springs and/or the coil springs 26) moving the body upwardly as the weight of the lading is discharged therefrom. Substantial variations occur in the above tendencies to tilt or heel laterally under sidewise pressure and to lift vertically under the action of the car springs, in different types and constructions and different ages of railroad dump cars, but as illustrative of typical or average operating conditions I find that there may be 5 or 6 inches or more side tilting or side play and 2 or 3 inches or more spring-raised upward movement. In constructions in which there is no toggle linkage 54–58 for permitting upward movement of the vibrator head 60—while still maintaining the very strong downward force component on the vibrator head tending to resist such upward movement—detrimental operating difficulties, and rapid wear of the apparatus are very likely to arise, particularly in prior constructions which do not have the vibratory head 60 mounted on the vertically flexing cushioning springs 120 to be later described. In contrast to these difficulties, the provision of the toggle link arrangement 54–58 permits the vibrator head 60 to yield to the larger upward force components of the dump car body—while still very strongly resisting such upward force components. The toggle link arrangement also has the advantage of preventing the vibrator head from sliding upwardly along the side surface of the car body in the laterally tilted position of the body.

Referring now to the construction of the vibratory head 60, this is preferably but not necessarily of the type wherein an eccentrically mounted weight is revolved at a relatively high speed around the axis of a driving shaft. The head comprises a substantially vertical vibratory plate 102 having narrow gripping ribs 104 extending horizontally across its face to increase its gripping engagement with the side surface of the railroad car. Extending horizontally across the opposite or back face of the vibratory plate 102, and formed integral therewith, is the cylinder 106 within which the vibratory weight 108 revolves in an eccentric orbit around the axis of the horizontally extending driving shaft 110. This driving shaft 110 has bearing support in bearing bosses extending from cylinder heads 112 which are bolted to close the ends of cylinder 106. The shaft 110 projects at one end to receive a power drive from a source of power carried by the complete vibrator assembly. In one embodiment of the invention, this shaft 110 is electrically driven through a belt drive from an independent electric motor; and in another embodiment of the invention this shaft is hydraulically driven by a hydraulic motor mounted on the shaft, both of which embodiments will be later described.

Referring again to the vibratory plate 102, this is preferably of rectangular outline, and projecting from the back side thereof is a relatively deep central rib or flange 116 extending vertically from top to bottom of the pressure plate. Also projecting from this side of the pressure plate, to each side of the back-bone rib 116, are two narrower ribs or flanges 118, 118, the vibrator cylinder 106 passing through all three ribs or flanges and being formed integral therewith. Projecting rearwardly from the corners of the vibratory plate 102 are four cup-shaped sockets 119, in which seat the forward ends of four heavy compression springs 120 which resiliently transmit the large thrusting pressure of the hydraulic ram 72 to the vibratory plate 102. The other ends of these compression springs 120 seat in similar cup-shaped sockets 121 projecting forwardly from the four corners of a vertical thrust plate 122. This thrust plate 122 receives the hydraulically powered forward thrust of the toggle beam 54 under the action of the hydraulic ram 72. The plate 122 may have its rear side welded directly to the vertical side flanges 54' and transverse web 54" of this toggle beam; or, alternatively, the aforementioned laterally deflectible safety mounting may be interposed between this thrust plate 122 and the toggle beam 54, as will be presently described. Formed in the thrust plate 122 are pairs of upper and lower holes 124, 125 through which slidably pass the threaded side legs of upper and lower U-shaped clevises or U-bolts 127, 128, these threaded side legs having nuts 129, 129' screwing over the threads into rigid abutment against the front and rear faces of the thrust plate 122. The looped front ends of these U-bolts pass through relatively large upper and lower openings 130, 131 extending transversely through the centrally disposed main rib 116 projecting from the vibratory plate 102. When the vibratory plate 102 is not in pressure engagement against the side of a dump car, the compression springs 120 are distended, with the looped ends of the U-bolts 127, 128 bearing against the back edges of the large openings 130, 131, at which time it will be seen that the U-bolts function as spring limiters for limiting the extent of forward motion which the compression springs 120 can transmit to the vibratory plate 102 relatively to the thrust plate 122. When the vibratory plate 102 is forced up against the side of the railroad car under hydraulic pressure, the heavy compression springs 120 yield appreciably so that the vibratory plate 102 is carried solely by the full-floating spring mounting with respect to the thrust plate 122, without any other guiding surfaces or vibration transmitting connections therebetween, thereby minimizing the transmission of vibratory stresses from the vibratory plate 102 outwardly to the toggle linkage and hydraulic ram, etc. Such compression of the springs 120 is accommodated by the looped ends of the U-bolts 127, 128 moving into the forward portions of the large openings 130, 131. It will be observed that the four compression springs 120 are widely spaced from each other, both horizontally and vertically, so as to establish a wide measure of stability of the pressure engagement of the vibratory plate 102 against the side of the car body 24, in all directions. This full floating spring mounting of the vibratory plate 102 enables this plate to tilt vertically as the side wall of the car tilts in the lateral heeling of the car body, as shown in FIGURE 2; and it also enables the plate 102 to tilt laterally to accommodate a rivet head or other like part projecting from the side surface of the car body. The vibratory head or plate 102 is forced into engagement with the side wall of the dump car under a relatively high total pressure, preferably of the order of 10 to 15 tons, i.e. under a total pressure of approximately 25,000 pounds or more, as set forth in the introductory portion of this description. These high engaging pressures are readily attainable by the introduction of large hydraulic pressures into the ram cylinder 74.

I shall now describe the laterally deflectible safety mounting of the vibratory head 60 on the forward end of the thrusting toggle beam 54. As previously described, this safety mounting is provided to take care of the possible contingency of a careless locomotive engineer or other negligent train attendant starting the railroad dump car 22 rolling along the rails 30 while the vibrator head 60 still remains clamped to the side of the dump car under the heavy thrusting pressure of the hydraulic ram 72. This laterally deflectible safety mounting comprises two vertical laterally spaced parallel link plates 135, 135 which are pivotally mounted for swinging movement around the axes of a front pair of laterally spaced pivot pins 137 and around the axes of a rear pair of laterally spaced pivot pins 139, such swinging movement being first subject to the shearing of shear pins which normally prevent such swinging movement. The two laterally spaced front pivot pins 137, 137' pass down through vertically spaced upper and lower hinge bosses 141, 142 which have welded attachment to the back side of thrust plate 122. Interposed between these upper and lower hinge bosses, and also receiving the pivot pins 137, are intermediate hinge bosses 144 which are secured to the front edges of the parallel link plates 135, 135. The two laterally spaced rear hinge pins 139 pass down through vertically spaced upper and lower hinge bosses 146, 147 which have welded attachment to the rear edges of the two parallel link plates 135, 135. Interposed between these upper and lower hinge bosses 146, 147 are intermediate hinge bosses 149 which have welded attachment to the rear edges of the depending side flanges 54' of toggle beam 54.

Referring now to the arrangement of the shear pins or bolts, the top edges of the parallel link plates 135 are both formed with horizontally extending flanges 151, in each of which there is a downwardly extending hole 153. Welded to the back side of each upper front hinge boss 141 is an angle bracket 155, the horizontal leg of which overlies the adjacent horizontal flange 151, such horizontal leg also having a vertical hole 157 therethrough which normally lies in registration with the vertical hole 153. Shear pins or shear bolts 160 pass down through these aligned holes 153, 157 and normally block the parallel link plates 135, 135 against horizontal swinging movement, these parallel link plates then functioning as a pair of rigid forwardly extending struts for rigidly holding the thrust plate 122 on the end of the toggle beam 54. In the event that rolling impetus is given to the dump car 22 in either direction along the rails 30, while the vibratory head 60 is still firmly clamped against the side of the dump car, the sidewise stresses set up in the vibratory head, in either direction of deflection, will operate to shear the shear pins. This permits immediate sidewise parallel link motion of the link plates 135, 135, which simultaneously retracts the vibratory head out of high pressure engagement against the side of the car. Thus, no destructive side stresses are transmitted to the quadrangular system of linkage 44, 46, 54, etc. The apparatus is immediately restored to normal operating condition by merely substituting new shear pins.

My invention also embodies an improved electrically triggered automatic withdrawing apparatus which similarly safeguards the quadrangular linkage system and other parts against damage otherwise caused by inadvertent rolling motion of the car, this automatic withdrawing apparatus functioning to instantly withdraw the vibratory head 60 from out of engagement with the side of the dump car as soon as rolling motion is inadvertently given to the dump car in either direction. This electrically triggered withdrawing mechanism will be later described after describing the two embodiments of driving apparatus for driving the rotary vibrator shaft 110, i.e., the electric motor belt drive, and the hydraulic motor direct mounted drive. Referring first to the electric motor belt drive, an electric motor 162 is mounted along side of the quadrangular link pressure frame 44, 46, etc. on a separate swinging link frame 164. This motor 162 carries a multiple groove driving sheave 165 which transmits power through two or more belts 166 to a multiple groove driven sheave 167 which is mounted on the outer end of the vibrator shaft 110. The upper and lower runs of both belts 166 pass through a rectangular belt guiding frame 168 which is anchored in a vertically disposed position to lugs projecting from the adjacent rib or flange 118 of the vibratory plate 102. The adjacent vertical edge of the thrust plate 122 has its intermediate portion recessed or set back to permit the passage of the belts 166. The belt guiding frame 168 retains the belts on the driving and driven sheaves during swinging movement of the quadrangular link pressure frame and of the motor frame 164, and also during any transverse or lateral cocking of the vibratory plate 102 in its engagement against a protuberance or uneven surface on the side of the railroad dump car.

The electric motor 162 is mounted on a platform 172 constituting the upper horizontal member of the swinging link frame 164. Extending downwardly from the front and rear ends of this platform 172 are pivot lugs carrying transverse front and rear pivot pins 174 and 175. These pins establish pivotal connection with front and rear swinging links 176 and 177 extending downwardly to one side of the quadrangular link pressure frame 44, 46, etc. These parallel links 176 and 177 are preferably of channel shaped section comprising transverse web portions having angularly bent side flanges. The lower ends of said parallel links 176 and 177 are pivotally mounted on pivot pins 178 and 179 which are supported in pivot lugs carried by angle bars 183 welded to the adjacent base angle bar 36. The weight of the electric motor 162 normally tends to swing the motor mounting frame 164 in a rearward and downward direction toward the left, this being resisted by the driving belts 166, from which it will be seen that some continuous driving tension will be maintained on the belts. A stop bracket 186 at the rear edge of the platform 172 is adapted to engage a stop bracket 187 projecting from the toggle beam 54, these stop brackets only serving to limit downward swinging movement of the motor mounting frame when the driving belts 166 are removed. A pair of helical tension springs 188 have their rear ends hooked to U-shaped clevis bolts 189 which are anchored in the transverse web portion of rear link arm 177 adjacent to the base pivot 179. The other ends of these tension springs 188 are hooked to link chains 192 which pass through keyhole slots 193 formed in the transverse web portion of the front link arm 176, preferably at a point substantially midway between the upper and lower pivots 174 and 178. The circular upper ends of the keyhole slots 193 pass the links of the chains 191 when it is desired to adjust the deflection point and deflection tension of the springs 188, the dropping of the selected chain link down into the lower narrow portion of the keyhole slot 193 locking the chain in the established position of adjustment. When the motor mounting link frame 164 occupies its retracted position folded to the left, at which time the vibratory head 60 also occupies its retracted position out of engagement with a railroad car, the closer proximity of the upwardly extending link arms 176 and 177 places slack in the chains 191 and tension springs 188. Thus, in this normal retracted position the springs 188 do not add driving tension to the driving belts 166. On the other hand, when the vibrator head 60 has been advanced into engagement with the side of a dump car the corresponding forward movement of the motor mounting frame 164 separates the link arms 176 and 177 and places the springs 188 under tension so that these springs thereupon become effective to add driving tension to the driving belts 166.

Referring now to the directly mounted hydraulic motor drive shown in FIGURE 9, in this embodiment the separate electric motor 162 and swinging link motor frame 164 are dispensed with and a hydraulically operated motor 195 has direct driving attachment to the vibrator shaft 110. This hydraulic motor 195 has its outer housing bolted to the adjacent cylinder head 112 of the vibratory cylinder 106, and the internal driving apparatus may be of any desired type, such as the vane type, gear type, lobe type, etc. The hydraulic liquid is supplied to this motor through the supply and return hoses 198 and 199.

In FIGURE 10 I have illustrated a slightly modified mounting of the vibratory head 60. In this mounting, the head is given a normal downward and outward cant, represented by the sloping dotted line C—C, so that as the vibratory plate 102 approaches the side of the car body the upper edge of this plate contacts the car body before any other part of the plate. This cant or outward slope is intended to compensate for the lateral tilting or heeling which the car body undergoes in the dumping operation, as shown in FIGURE 2. This normal cant or slope C—C may be embodied in the belt driven embodiment of FIGURE 1 or in the direct mounted hydraulic motor driven embodiment of FIGURE 9.

Referring now to the details of the previously mentioned electrically triggered withdrawing apparatus, this apparatus is best shown in FIGURES 2 and 6, and comprises a normally closed, double acting switch 200 having a laterally movable, contact actuating lever 201 extending upwardly therefrom. This lever normally occupies an upright contact closing position, and is adapted to be rocked to the right or to the left by the laterally spaced pusher disks 202 or 203, this occurring concurrently with a lateral component of motion which starts building up in the vibratory head 60 upon accidental motion of the dump car during a dumping operation. Such rolling motion in either direction operates through the pusher disks 202 or 203 to rock the switch lever 201 to one side or the other, in either of which positions the switch opens a normally closed control circuit for immediately retracting the vibratory head 60.

This switch 200 and pusher disks 202, 203 are located between the side flanges 56' of the short toggle link 56. The switch 200 with its actuating lever 201 are mounted at the top of an upwardly extending trussed frame 205 which is pivotally mounted on the base angles 36, 36 for fore and aft swinging movement concurrently with the fore and aft swinging movement of the quadrangular system of pivoted links 44, 46, etc. This trussed frame 205 comprises laterally spaced side bars 207 which are pivotally connected at their lower ends at 208 to the base supporting angles 36, 36. Diagonal trussing 210 between the side bars 207 establishes lateral stiffness in the frame 205 against lateral deflection. This frame 205 is caused to pivot fore and aft substantially concurrently with the pivoting of the front link arms 46 through the medium of an interconnecting bolt 212. This bolt 212 passes loosely through an aperture in the web of the front link arm 46 and through an aperture in the horizontal cross bar 211 of the frame 205. Nuts 214 screw over the ends of the loosely fitting bolt 212, and a compression spring 216 surrounding the bolt retains the trussed frame 205 at the desired fore and aft spacing from the link arm 46, as determined by the adjustment of the nuts 214. The two laterally spaced switch actuating deflectors 202 and 203 are preferably in the form of disks or bars carried on the inner ends of spools 218, 218 which are internally threaded for mounting on screws 220 that pass through apertures in the side flanges 56' of the small toggle link 56. Lock nuts 224 lock the screws 220 in the side flanges 56', and also lock the spools 218 at different points along the screws 220 for predetermining the spacing between the deflectable pusher disks 202 and 203 and the laterally deflectable switch actuating arm 201. It will be seen from the foregoing that accidental rolling motion given to the dump car while in the process of dumping, or before the vibratory head 60 has been released therefrom, will operate through the vibratory head and its mounting linkage to deflect either one or the other of the two pusher members 202 and 203 into engagement with the laterally deflectable actuating arm 201 of the normally closed triggering switch 200. This immediately opens a control circuit 234, 235 which causes the automatic withdrawing apparatus to function so as to immediately withdraw the vibratory head 60 from out of engagement with the side of the dump car, as will now be described in connection with FIGURE 9.

FIGURE 11 illustrates the electrical circuits, hydraulic lines and compressed air lines of a system embodying such automatic withdrawing apparatus. The electrical supply is preferably a three phase service, indicated at 230, which enters the system through a normally closed control switch 231 which is adapted to open all three supply lines on the de-energization of a locally responsive solenoid 232. When the car vibrator is in service, this solenoid 232 normally stands energized over control circuit 234, 235 by the normally closed circuit condition of distortion responsive switch 200, which control circuit receives electrical energy from between two of the conductors 230 on the input side of the local control switch 231.

A feeder circuit 237 extends from the output side of this control switch 231 to an electrical motor 238 which drives the hydraulic pump 241. The inlet side of this pump 241 draws hydraulic liquid from a common liquid reservoir or sump which is indicated schematically at 242. The outlet side of the hydraulic pump 241 supplies this liquid through hydraulic lines 88 and 88' to the lower end of the hydraulic ram cylinder 74. Branching off this hydraulic line 88 is an automatic pressure relief valve 244 which has a pressure relief return to the sump 242. Any desired pressure setting may be given to this pressure relief valve 244, depending upon the pressure which it is desired to have the ram 72 exert against the vibratory head 60. These hydraulic lines 88 and 88' connecting with the lower end of the ram cylinder 74, and the hydraulic lines 89 and 89' which connect with the upper end of the ram cylinder 74, both pass through a four-way control valve 246 which is adapted to be manually operated for performing the different control functions, as will be presently described. Branching from the hydraulic line 88 to the sump 242 at a point between the manually operated control valve 246 and the lower end of the ram cylinder 74 is a normally closed, automatically opened dump valve 248 which, upon opening, is adapted to afford quick egress of the hydraulic liquid from the lower end of the ram cylinder 74 back into the sump 242 in the trigger operated withdrawing operation. This valve 248 is adapted to be moved into its open dumping position by the de-energization of a solenoid 250 which is connected in the triggering circuit 234, 235 in series with the other control solenoid 232, whereby both of these control solenoids are instantaneously de-energized in response to the triggering action of the deflection responsive switch 200.

Referring again to the four-way manual control valve 246, the hydraulic line 88 enters this valve 246 through port 88b, and the extension 88' of hydraulic line 88 enters this valve through oppositely aligned port 88a. In like manner, the hydraulic line 89 connecting with the upper end of cylinder 74 enters the valve housing 246 through port 89a, and the extension 89' of this hydraulic line communicates with the valve housing through the oppositely aligned port 89b, the other end of this extension line 89' connecting with the sump or hydraulic liquid reservoir 242. Control valve 246 is movable into any one of three different positions, indicated as positions "A," "B" and "C." The valve is spring biased so as to normally stand in position "A," in which position the two lines 88 and 89 connecting with opposite ends of the ram cylinder 74 are both blocked off, and the extension lines 88' and 89' are cross-connected together through the valve so that the pump 241 discharges directly into the reservoir 242. When the manual control valve 246 is manually moved to position "B" for the purpose of extending the hydraulic ram to force the vibratory head 60 into high pressure engagement with the side of the dump car, the valve port 88a is placed in communication with valve port 88b, so that the hydraulic pressure transmitted from the pump 241, as modulated by the adjustable setting of the pressure relief valve 244, is applied to the underside of the ram piston 75 for forcing the vibratory head 60 into engagement with the side of the car. Concurrently therewith, the hydraulic liquid in the upper end of the ram cylinder 74 is discharged through hydraulic lines 89 and 89' and ports 89a and 89b back to the liquid reservoir 242. If desired, the manually controlled valve 246 may be permitted to remain in position "B" after the ram 72 has forced the vibratory head 60 against the side of the car, in which position the communicating ports 88a and 88b continue to transmit the relatively high pressure from the line 88' to the lower end of the ram, whereby the vibratory head 60 continues to be pressed against the side of the car under the full hydraulic pressure throughout the aforementioned movements of the car body during the dumping operation, namely, during the lateral tilting or heeling of the body under the hydraulic pressure, and during the rising of the car body under the force of the truck springs 26, etc. as the lading is dumped. Conversely, if the operator should so desire, he can permit the control valve to move back automatically into position "A" after the hydraulic ram has forced the vibratory head 60 with the highest predetermined degree of hydraulic pressure against the side of the car, resulting in the very substantial compression of the springs 120. The pressure of the springs 120 may then be relied upon to follow up the lateral tilting of the car body. However, in the event that the car body should tilt through an exceptionally large angle, the operator can immediately restore the effective pressure engagement of the vibratory head against the side of the car by momentarily moving the valve back to position "B."

At the completion of the dumping operation, the operator manually moves control valve 246 into position "C," for the purpose of hydraulically retracting the vibratory head 60 out of engagement with the side of the dump car. In this position of control valve 246, the four ports 88a–89b are reversed or cross connected through the movable slide or rotor element of the valve 246 so that port 88a is connected with port 89a, and so that port 88b is connected with port 89b. This places the pump pressure on the top side of the ram piston 75, and connects the lower end of the ram cylinder to the reservoir 242. As a result, the ram immediately retracts and withdraws the vibratory head 60 from out of engagement with the side of the dump car, as represented by the dotted line position of the supporting linkage shown in FIGURE 1.

For effecting the electrically triggered withdrawal of the vibratory head 60 pursuant to the opening of the triggering switch 200, as a result of the dump car starting to accidentally roll along the rails 30, I provide the system with a compressed air reservoir 255 which is supplied with compressed air through inlet check valve 256 from any available compressed air line; or where no such line is available, from an independent compressor constituting part of the car vibrator installation. The air pressure from this reservoir is transmitted through pipe 258 to a solenoid responsive control valve 259, from whence it is transmitted through pipe 261 and check valve 262 into the hydraulic line 89 which connects with the upper end of the ram cylinder 74. The automatic control valve 259 normally moves to open position, but is held closed by the energization of a solenoid 260 which is connected in series with the normally energized control circuit 234, 235. Hence, upon the de-energization of this control circuit and of solenoid 260, the valve 259 immediately opens and permits compressed air to flow from the reservoir 255 through check valve 262 and hydraulic line 89 into the upper end of the ram cylinder 74 for effecting immediate withdrawal of the vibrator head 60 from the side of the car. Also connecting with the air reservoir 255 is a pressure responsive circuit closing switch 265 having normally open contacts that are not brought into engagement with each other until the air pressure in the reservoir 255 has reached a predetermined maximum. This pressure responsive switch 265 controls the continuity of triggering circuit 234, 235. This circuit extends in series through the three solenoids 232, 250 and 260, and also through the deflection detecting switch 200 and the compressed air safety switch 265. When the car vibrator is put into service to start vibrating a car, the safety switch 265 does not close to complete the triggering circuit 234, 235 until the air pressure within the reservoir 255 has been built up to the desired maximum. At this time, the deflection detecting switch 200 is in its normal closed circuit position so that the triggering circuit 234, 235 then becomes energized, thereby energizing the three control solenoids 232, 250 and 260. The solenoid 232 holds the main control switch 231 in closed circuit position; the solenoid 250 holds the hydraulic dump valve 248 in closed position; and the solenoid 260 holds the compressed air control valve 259 in closed position. The triggering circuit 234, 235 is normally maintained in this energized condition throughout the performance of a car dumping cycle, including the extension and retraction of the hydraulic ram 72 for moving the vibratory head 60 into and out of engagement with the dump car.

If, while the hydraulic ram 72 is extended for holding the vibratory head 60 forcibly against the side of the dump car, the car should be accidentally moved along the rails, this would immediately start the quadrangular linkage 42, 44 etc. flexing in that direction of travel relatively to the trussed frame 205. Such would bring one of the switch actuating disks or bars 202 or 203 against the switch actuating lever 201, thereby causing the triggering switch 200 to break the control circuit 234, 235. This would immediately operate through the de-energization of solenoid 232 to open the electrical supply circuit 237 to the pump motor 238; would operate through the de-energization of solenoid 250 to open dump valve 248 for discharging hydraulic liquid from the lower end of ram cylinder 74; and would operate through the de-energization of solenoid 260 to open valve 259 for admitting compressed air to the upper end of ram cylinder 74 for immediately retracting the vibratory head out of engagement with the side of the dump car. The rapidity of this withdrawing operation insures the complete separation of the vibratory head from the car, before the quadrangular link frame 42, 44, etc. can be subjected to any destructive sidewise stresses.

The control circuit 234, 235 also safeguards all of the apparatus against power failure on the electrical power supply line 230. If this failure should occur during a car vibrating operation, the de-energization of the three solenoids 232, 250 and 260 would result in the immediate retraction of the vibratory head, out of engagement with the side of the dump car.

Still further, this control circuit 234, 235 will, in the event of an accidental break in either of the circuit conductors, result in the de-energization of all three solenoids, with the resulting retraction of the vibratory head to its retracted position and the stopping of the pump 241 and of the rotary element in the vibratory head 60.

In FIGURE 11 I have shown the embodiment of control system which is used when the vibrator shaft 110 is belt driven from the auxiliary electric motor 162. In this embodiment a branch circuit 270 for the separate electric motor 162 connects with the output side of the manually operated control switch or starter 233 for starting the pump motor 238. Thus, in the event of automatic opening of the control circuit 234, 235 by distortion deflection of the triggering switch 200, or by failure of the power supply etc., the operation of the auxiliary vibrator driving motor 162 is interrupted concurrently with the automatic retraction of the vibratory head 60. If desired, a manually operated switch 272 may be interposed in the branch circuit 270 so that the driving of the vibratory shaft 110 can be delayed until the vibratory head 60 has been hydraulically forced into pressure engagement with the side of the dump car.

In FIGURE 12 I have shown a slightly different embodiment of control system which is used when the vibrator shaft 110 is driven from the direct mounted hydraulic motor 195. This system is substantially the same as that previously described with respect to the automatic triggering control exercised by the control circuit 234, 235; but differs from the control system of FIGURE 11 in that the hydraulic extension line 89′ leading from port 89b of control valve 246 does not discharge back directly into the reservoir 242, but instead it connects through a secondary manual control valve 274 with the hydraulic motor 195 which is mounted directly on the vibratory head 60. This manually operated control valve 274 has four ports 274a, 274b, 274c and 274d in its housing which are placed in different paths of communication through the sliding or rotary motion of the inner valve core. The hydraulic extension line 89′ connects with port 274a, and leading from the opposite port 274b is a hydraulic conduit 276 which connects with the admission port of the hydraulic motor 195. The discharge port of this hydraulic motor 195 connects through hydraulic conduit 278 with the port 274c of valve 274, and the opposite port 274d of this valve has direct connection with the sump or reservoir 242.

This second manually operated valve 274 has two control positions, designated "X" and "Y" respectively, position "X" corresponding to the substantially inert or non-running condition of the hydraulic motor 195, and position "Y" corresponding to the power driven running condition of the motor. In position "X," through communication is established for the admission and discharge lines 276 and 278, but a very large capacity by-pass or shunt passageway 280 connects the admission and discharge lines so that substantially all of the pump capacity is diverted back to the reservoir 242, and hence the motor 195 does not operate. In position "Y," straight through communication is established for the admission and discharge lines 276 and 278, without the by-pass 280 being effective, and hence the full hydraulic pressure of the pump 241 is transmitted to the motor 195 for operating the latter at full speed. When secondary valve 274 is in this running position "Y," the primary control valve 246 should be in its normal or "A" position where it directs the pump pressure into hydraulic extension line 89′. The purpose of having through communication with the hydraulic motor 195 when the secondary control valve 274 is moved into its shunting, non-running position "X," is to prevent the abrupt sudden stopping of hydraulic motor 195 when the control valve is moved into this position, owing to the incompressible nature of the hydraulic liquid.

I have shown the different embodiments of the invention provided with both the laterally deflectable safety mounting utilizing the shear pins 160, and also with the electrically triggered withdrawing mechanism responsive to the laterally deflectable triggering switch 200. For installation where a maximum degree of safeguarding is desired, both mechanisms can be used. Where more economy of construction is desired, the electrically triggered withdrawing mechanism responsive to the triggering switch 200 can be employed alone, and where maximum economy of construction is desired the laterally deflectable mounting using the shear pins 160 can be employed alone.

While the provision of the toggle linkage 54–58 is a preferred construction because of its advantageous function of permitting upward movement of the vibrator head 60 during the tilting and lifting of the car body, while still maintaining a very strong downwardly acting force component on the vibrator head tending to resist such upward movement, nevertheless this toggle linkage 54–58 can be dispensed with, possibly at some sacrifice of the above advantageous function, by adjusting the U-bolts 128 so that the compression springs 120 can accommodate most or all of the tilting and lifting of the car body. For example, by slackening off the U-bolts 128, the vibrator head 60 can be made to assume a normal position hanging or drooping down substantially below the line of the swinging beam 54, and with a substantial angle of cant C—C (FIGURE 10). When forced into engagement with the side of the car body in this hanging position, the springs 120 are given more latitude of vertical flexure to accommodate the tilting and lifting of the car body. In such embodiment, the front toggle link 56 would be dispensed with, and the pivot 54 and pusher disks 202, 203 would be mounted directly in the side flanges 54′ of the swinging channel beam 54.

As previously mentioned, the rotating eccentric type of vibrator 106, 108, 110 is the preferred construction, but other vibrators either of the rolling ball, reciprocating piston or any other type may possibly be employed.

Where maximum precaution is desired, the manually operated control valve 246 in the system of FIGURE 11, or the two manually operated control valves 246 and 274 in the system of FIGURE 12, may be provided with "dead-man" controls in the form of a manually held lever or levers, which, in the event of sudden disability of the operator, will automatically move the valve or valves to positions for interrupting the vibrator operation and for withdrawing the vibrator head from engagement with the car.

While I have illustrated and described what I regard to be the preferred embodiments of my invention, nevertheless it will be understood that such are merely exemplary and that numerous modifications and rearrangements may be made therein without departing from the essence of the invention.

I claim:

1. In a railroad car vibrator, the combination of a base structure stationarily located at the dumping site, mounting linkage carried by said base structure and movable substantially horizontally relatively thereto, a vibrator head carried by said mounting linkage and comprising a moving vibrator, means for driving said moving vibrator, hydraulic means for swinging said mounting linkage to carry said vibrator head into high pressure engagement against the side of the railroad car body, and toggle linkage embodied in said mounting linkage for permitting upward movement of said vibrator head with the car body in the dumping operation, while simultaneously therewith creating a downward force component in said vibrator head concurrently with its high pressure engagement against the side of the railroad car and acting in opposition to such upward movement.

2. In a railroad dump car vibrator, the combination of a base structure stationarily located at the dumping site, front and rear pivotally swinging link arms extending upwardly from said base structure, a substantially horizontal beam structure pivotally mounted on the upper ends of said front and rear link arms, a vibrator head mounted on the front end of said beam structure and comprising a rotary vibratory element, means for driving said rotary vibratory element, a hydraulic ram reacting between said base structure and said beam structure for swinging said vibrator head into high pressure engagement against the side of the car body and toggle mechanism associated with said beam structure operative to permit upward movement of said vibrator head with the tilting and lifting of the car body in the dumping operation, said toggle mechanism being operative to create simultaneously therewith a downwardly acting force component in said vibrator head in its pressure engagement against the side of the railroad car.

3. In a railroad dump car vibrator, the combination of a base structure stationarily located at the dumping site, a substantially horizontal beam structure having pivotal mounting on said base structure for movement toward and away from the railroad car, a vibrator head mounted on the front end of said beam structure comprising a rotary vibratory element, means for driving said rotary vibratory element, hydraulic means for pivotally swinging said beam structure to bring said vibrator head into high pressure engagement against the side of the dump car, automatic safety release mechanism for permitting relative separation between said vibrator head and said car if the car should inadvertently start rolling while the vibrator head was in high pressure engagement therewith, said safety release mechanism comprising horizontally swinging parallel link plates mounting said vibrator head on the front end of said beam structure, and shear pin means normally holding said parallel link plates in substantially rigid non-pivoting relation but operative by shearing in the event of movement of the car to permit such horizontal swinging movement of said link plates.

4. In a railroad dump car vibrator, the combination of a base structure, mounting linkage carried by said base structure and movable substantially horizontally relatively thereto, a thrust plate carried by the front end of said mounting linkage, a vibrator head carried by said thrust plate, said vibrator head comprising a moving vibratory element, means for driving said moving vibratory element, a hydraulic ram connected between said base structure and said mounting linkage for swinging said mounting linkage to bring said vibrator head into high pressure engagement against the side of the railroad car, and a floating spring mounting interposed between said thrust plate and said vibrator head, said floating spring mounting comprising pairs of upper and lower compression springs interposed between said thrust plate and vibrator head, a rib projecting rearwardly from said vibrator head, upper and lower transverse holes through said rib, and upper and lower U-bolts carried by said thrust plate and passing through said upper and lower holes for restraining the spring urged separating movement between said thrust plate and said vibrator head.

5. In a railroad dump car vibrator, the combination of a base structure, mounting linkage carried by said base structure and movable substantially horizontally relatively thereto, said mounting linkage comprising an upper beam structure, and spaced front and rear link arms pivotally connected at their lower ends to said base structure and pivotally connected at their upper ends of said beam structure for permitting translational swinging motion of said beam structure toward and away from the railroad dump car, a thrust plate carried by the front end of said upper beam structure, a vibrator head comprising a vibrator plate extending substantially parallel to said thrust plate, said vibrator head comprising a rotating vibratory element rotating about an axis carried by said vibrator head, means for driving said rotating driving element, a hydraulic ram connected between said base structure and said mounting linkage for transmitting a line of thrust to said mounting linkage in the direction of the car for swinging said mounting linkage to bring said vibrator head into high pressure engagement against the side of the railroad car, a set of three or more compression springs extending substantially horizontally between said thrust plate and said vibrator plate, said compression springs being disposed on separate substantially parallel axes spaced vertically above and below said axis of the rotating vibratory element and also being spaced horizontally to each side of said line of thrust transmitted from said hydraulic ram, whereby to maintain stability of vibratory bearing engagement of the vibratory plate against the outer side surface of the car body as the body tilts in the dumping operation, and spring centering means on said thrust plate and on said vibrator plate engaging with the ends of said compression springs for holding said springs suspended between said plates.

6. In a railroad dump car vibrator, the combination of a base structure stationarily located at the dumping site, front and rear pivotally swinging link arms extending upwardly from said base structure, a substantially horizontal beam structure pivotally mounted on the upper ends of said front and rear link arms for substantially horizontal translational motion on said link arms toward and away from the railroad dump car, a vibrator head mounted on the front end of said beam structure and comprising a rotating vibratory element, a hydraulic ram reacting between said base structure and said beam structure for swinging said vibrator head into high pressure engagement against the side of the railroad dump car, an electric motor for driving said rotating vibratory element, pivotally swinging support means pivotally supported on said base structure and supporting said electric motor, and a belt drive connecting said electric motor with said rotating vibratory element, said belt drive causing said electric motor and its pivotally swinging support means to swing toward the railroad car concurrently with the substantially horizontal translational motion of said beam structure toward the car.

7. The combination of claim 6 including spring means for biasing said pivotally swinging support means in such direction as to maintain said belt drive under tension, and including means for adjusting said spring means.

8. In a railroad dump car vibrator, the combination of a base structure, front and rear stationary fixed axis pivots anchored to said base structure adjacent to the front and rear ends thereof, a quadrangular system of mounting linkage comprising front and rear pivotally swinging link arms having their lower ends pivotally mounted on the fixed axes of said front and rear stationary pivots and having their swingable upper ends extending upwardly from said base structure, a substantially horizontally extending beam structure pivotally mounted on the swingable upper ends of said front and rear link arms, a vibrator head mounted on the front end of said beam structure and comprising a moving vibratory element projecting forwardly therefrom for engaging with the side of the railroad dump car for accelerating the discharge of the load from the car, a hydraulic ram disposed in the position of an extensible strut extending diagonally between the lower rear corner and the upper front corner of said quadrangular system of linkage, said hydraulic ram being operative upon extension to elongate said quadrangular system of linkage in a substantially horizontal direction to transmit substantially horizontal endwise translational motion to said beam structure for carrying said vibrator head into high pressure engagement against the side of the railroad dump car body, said horizontally extending beam structure remaining substantially parallel to the plane of said front and rear fixed axis pivots in the different shifted positions of said beam structure, and automatic safety release mechanism for permitting relative separation between said vibrator head and the car if the car should inadvertently start rolling in one direction or the other while the vibrator head is in high pressure engagement therewith, said automatic safety release mechanism remaining completely non-operative while the car is standing stationary during the vibratory operation of said vibrator head for accelerating the discharge of the load from the dump car, and only becoming operative to effect automatic separation between the vibrator head and the car when said inadvertent rolling motion begins while said vibrator head is clamped against the side of the car, said safety release mechanism comprising means enabling said vibrator head to move completely outside of the confines of the side and end walls of the car, whereby to insure that such inadvertent rolling motion of the car will not trap or hold any portion of the car vibrator and thereby introduce destructive stresses between the car vibrator and said base structure.

9. In a railroad dump car vibrator, the combination of a base structure located to one side of the railroad rails at the dumping site, front and rear stationary fixed axis pivots anchored to said base structure, a substantially parallel link system of mounting linkage comprising front and rear pivotally swinging link arms having their lower ends pivotally mounted on the fixed axes of said front and rear stationary pivots and having their upper ends swingable in a direction toward and away from a railroad dump car at the dumping site, a substantially horizontal beam structure pivotally mounted on the upper ends of said front and rear link arms, a vibrator head mounted on the front end of said beam structure and comprising a rotary vibratory element, means for driving said rotary vibratory element, a hydraulic ram disposed in the position of an extensible strut extending diagonally between the lower rear corner and the upper front corner of said substantially parallel system of linkage, said hydraulic ram being operative upon extension to elongate said system of linkage in a substantially horizontal direction to transmit substantially horizontal endwise translational motion to said beam structure for carrying said vibrator head into high pressure engagement against the side of the railroad dump car body, and means embodied in said substantially parallel link system of mounting linkage for permitting upward movement of the vibrator head with the car body while still creating a downward force component in said vibrator head acting in opposition to such upward movement.

10. In a railroad dump car vibrator, the combination of a base structure located to one side of the railroad rails at the dumping site, front and rear stationary fixed axis pivots anchored to said base structure in a substantially horizontal plane, a substantially parallel link system of mounting linkage comprising front and rear pivotally swinging link arms having their lower ends pivotally mounted on the fixed axes of said front and rear stationary pivots and having their upper ends swingable in a direction toward and away from a railroad dump car at the dumping site, a substantially horizontal beam structure pivotally mounted on the upper ends of said front and rear link arms, a vibrator head mounted on the front end of said beam structure and comprising a rotary vibratory element, means for driving said rotary vibratory element, a hydraulic ram disposed in the position of an extensible strut extending diagonally between the lower rear corner and the upper front corner of said substantially parallel system of linkage, said hydraulic ram being operative upon extension to elongate said system of linkage in a substantially horizontal direction to transmit substantially horizontal endwise translational motion to said beam structure for carrying said vibrator head into high pressure engagement against the side of the railroad dump car body, said horizontally extending beam structure remaining substantially parallel to the substantially horizontal plane of said front and rear fixed axis pivots in the different shifted positions of said beam structure, and toggle linkage embodied in said substantially parallel link system of mounting linkage for permitting upward movement of said vibrator head with the car body in the dumping operation, while simultaneously therewith creating a downward force component in said vibrator head concurrently with its high pressure engagement against the side of the railroad car and acting in opposition to such upward movement.

11. In a railroad car vibrator, the combination of a base structure located at the dumping site, a substantially horizontally extending upper beam structure supported above said base structure, spaced front and rear link arms extending upwardly from said base structure to said beam structure, front and rear lower pivots pivotally connecting the lower ends of said front and rear link arms to said base structure, front and rear upper pivot means pivotally connecting the upper ends of said link arms to said upper beam structure, a vibrator head carried at the front end of said beam structure and comprising a moving vibrator, means for driving said moving vibrator, high pressure power means for swinging said beam structure in a forward direction to bring said vibrator head into high pressure engagement against the car body, means cooperating with said upper pivot means for permitting upward movement of the vibrator head with the car body while still creating a downward force component in said vibrator head acting in opposition to such upward movement, and automatic safety release mechanism which remains completely non-operative so long as the car remains in stationary position on the rails during the dumping operation, but which automatically effects relative separation between said vibrator head and the car if the car should inadvertently start rolling in either one direction or the other while the vibrator head is in high pressure engagement therewith, said safety release mechanism comprising means enabling said vibrator head to move completely outside the confines of the side and end walls of the car to ensure that such accidental travel of the car will not trap or hold any portion of the car vibrator and thereby physically compel the destructive movement of the car vibrator relatively to said stationary base structure.

12. In a railroad dump car vibrator, the combination of a base structure, a movable mounting member carried by said base structure and movable substantially horizontally relatively thereto, a vibrator head carried by said movable mounting member, said vibrator head comprising a rotating vibratory element rotating about an axis carried by said movable mounting member, high pressure power means for moving said movable mounting member to bring said vibrator head into high pressure engagement against the side of the railroad car, a floating spring mounting between said movable mounting member and said vibrator head, said floating spring mounting comprising four separated compression springs disposed as two upper and two lower pairs of substantially parallel springs acting between said movable mounting member and said vibrator head along two upper substantially parallel thrust lines and along two lower substantially parallel thrust lines, two of said thrust lines acting in a plane disposed on one side of the plane of rotation of said rotating vibratory element, and the other two of said thrust lines acting in a plane disposed on the other side of said plane of rotation of the vibratory element, and spring restraining means for limiting the spring urged separation between said vibratory head and said movable mounting member, said restraining means being located intermediate said compression springs.

13. In a container vibrating device, the combination of a base structure, a substantially horizontally extending upper beam structure supported above said base structure, spaced front and rear link arms extending upwardly from said base structure to said beam structure, front and rear lower pivots pivotally connecting the lower ends of said front and rear link arms to said base structure, front and rear upper pivot means pivotally connecting the upper ends of said link arms to said beam structure, a vibrator head supported at the front end of said beam structure and comprising a rotating vibratory element rotating about an axis extending through said vibrator head, a hydraulic ram connected between said base structure and said beam structure for transmitting a line of thrust to said vibrator head to cause said vibrator head to be brought into high pressure engagement against the side of the container, means for driving said rotating vibratory element of said vibrator head, a set of compression springs resiliently mounting said vibrator head on the front end of said beam structure, said set of compression springs comprising substantially parallel horizontally extending springs spaced vertically above and below said axis of the rotating vibratory element and also spaced horizontally to each side of the line of thrust along which said beam structure transmits hydraulic thrust to said vibrator head, whereby to afford resilient stability of the pressure engagement of said vibrator head against the side of the container in both vertical and horizontal planes, a spring thrust limiting member carried by said upper beam structure, and a coacting spring thrust limiting member carried by said vibrator head and coacting with said other spring thrust limiting member for limiting the spring urged separation between said vibrator head and said upper beam structure when the vibrator head is not in pressure engagement against the side of the container.

14. In a container vibrating device, a beam, a base structure, a pair of link members spaced longitudinally with respect to each other along said beam and base structure and movably interconnecting said beam and said base structure in vertically spaced relationship for longitudinal movement of said beam relatively to said base structure, a vibrator mechanism, means supporting said vibrator mechanism on said beam, the latter means being flexible in a plane parallel to a plane which contains the major axis of said beam and which extends perpendicular to said base structure, means for urging said beam and said vibrating mechanism longitudinally with respect to said base structure into a container engaging position, the latter means including a powered device connected to said beam, at least one of said link members being connected to said beam by means providing for relative lateral movement of the latter link member with respect to said beam in a path parallel to said plane, and means interconnecting the latter link member and said beam operative to urge said link member in one direction relative to said beam in said path when said means for urging said vibrating mechanism is operative and is urging said mechanism into said container engaging position and said beam is urged in an opposite direction relative to the latter link by an exterior force received by said beam from said mechanism.

15. The vibrator structure of claim 14 wherein said powered means for urging same beam is connected to said beam so as to be effective to urge said link in said one direction simultaneously as said power means urges said vibrating mechanism into said position.

16. The combination as set forth in claim 1 which is further characterized by automatic safety release mechanism for permitting said vibrator head and car to effect relative separation if the car should inadvertently start rolling in either one direction or the other while the vibrator head is in high pressure engagement therewith, said automatic safety release mechanism comprising electrical switch means responsive to lateral deflecting motion of said vibrator head and mounting linkage in the event of such inadvertent motion of said car, and power means responsive to said electrical switch means operative to thereupon forcibly withdraw said vibrator head out of pressure engagement against the side of the car and to a position spaced laterally from the dump car completely outside of the confines of the side or end walls of the car so as to insure that such accidental travel of the car will not trap or hold any portion of the car vibrator and thereby physically compel destructive movement of the car vibrator relatively to said stationary base structure.

17. The combination as set forth in claim 2 which is further characterized by automatic safety release mechanism for effecting relative separation between said vibrator head and the dump car if the car should inadvertently start rolling while the vibrator head is in high pressure engagement therewith, said automatic safety release mechanism comprising an electrical triggering switch responsive to lateral deflecting motion of said vibrator head in the event of such inadvertent rolling motion of said car, means responsive to said electrical triggering switch for thereupon discharging hydraulic fluid from that side of the piston of said hydraulic ram against which hydraulic pressure has been acting to hold said vibrator head pressed against the side of the car body, and means also responsive to said electrical triggering switch for thereupon admitting compressed air to the opposite side of the piston of said hydraulic ram for quickly retracting the vibrator head out of pressure engagement against the side of the car.

18. The combination as set forth in claim 1 which is further characterized by automatic safety release mechanism for permitting said vibrator head and car to effect relative separation if the car should inadvertently start rolling while the vibrator head is in high pressure engagement therewith, said automatic safety release mechanism comprising horizontally swinging parallel link plates mounting said vibrator head on the front end of said mounting linkage, and shear pin means normally holding said parallel link plates in substantially rigid non-pivoting relation but operative by shearing in the event of movement of the car to permit such horizontal swinging movement of said link plates.

19. The combination of claim 2 wherein the means for driving said rotary vibrator element comprises a hydraulic motor mounted on said vibrator head and operatively connected to drive said rotating vibratory element.

20. The combination as set forth in claim 2 which is further characterized by automatic safety release mechanism for permitting said vibrator head and car to effect relative separation if the car should inadvertently start rolling along said railroad rails in either direction while the vibrator head is in high pressure engagement therewith, said automatic safety release mechanism comprising electrical switch means responsive to lateral deflecting motion of said vibrator head in a direction substantially parallel with said railroad rails in the event of such inadvertent motion of said car, power means responsive to said electrical switch means operative to thereupon forcibly withdraw said vibrator head out of pressure engagement against the side of the car and to a position spaced laterally from the dump car completely outside of the confines of the side or end walls of the car so as to insure that such inadvertent rolling motion of the car will not trap or hold any portion of the car vibrator and thereby physically compel destructive movement of the car vibrator relatively to said stationary base structure, and means also responsive to said electrical switch means to thereupon interrupt the operation of said moving vibrator.

21. The combination as set forth in claim 1 which is further characterized by a hydraulic motor mounted on said vibrator head and operatively connected for rotating said vibrator element, a hydraulic ram for moving said mounting linkage to carry said vibrator head into high pressure engagement against the side of the dump car body, a hydraulic pump drawing liquid from a liquid reservoir, a first manually operated control valve for controlling the flow of hydraulic liquid from said pump to said hydraulic ram, a second manually operated control valve for controlling the flow of hydraulic liquid between said pump and said hydraulic motor, a hydraulic pressure line for conducting hydraulic liquid under pressure from said pump to said second control valve, a hydraulic discharge line leading from said second control valve to said reservoir, said hydraulic motor comprising inlet and outlet ports, inlet and outlet lines leading from said inlet and outlet ports to said control valve, valve core means in said second control valve comprising passageways having two optional positions in both of which said hydraulic pressure line is connected to the inlet port of said hydraulic motor and said hydraulic discharge line is connected to the outlet port of said hydraulic motor, and a large capacity by-pass embodied in said core means operative in one of such positions to bypass liquid from said pump to said reservoir.

22. The combination as set forth in claim 2 which is further characterized by said hydraulic ram comprising a cylinder having a ram extension port at one end through which fluid under pressure is admitted for extending the ram and having a ram retraction port at its opposite end through which fluid under pressure is admitted for retracting said ram, a hydraulic pump for supplying hydraulic liquid from a reservoir to said ram extension port, a source of compressed air for supplying compressed air to said ram retraction port, an electric motor for driving said hydraulic pump, an electrical supply line for connection with said electric motor, a solenoid actuated control switch controlling the connection of said supply line with said electric motor, a solenoid actuated dump valve for discharging hydraulic liquid through said ram extension port back to the reservoir, a solenoid actuated air valve for connecting said compressed air source with the ram retraction port of said ram cylinder, a control circuit interconnecting the respective solenoids which actuate said control switch, said dump valve and said air valve, and an automatic safety release switch operative to control said control circuit if the dump car should inadvertently start rolling while the vibrator head is in high pressure engagement therewith.

23. In a railroad dump car vibrator, the combination of a base structure located at the dumping site, front and rear swinging link arms extending upwardly from said base structure, a substantially horizontal beam structure mounted on the upper ends of said front and rear link arms, a vibrator head mounted on the front end of said beam structure and comprising a moving vibratory element, a hydraulic ram reacting between said base structure and said beam structure for swinging said vibrator head into high pressure engagement against the side of the railroad dump car, and bearing pivots between the lower ends of said link arms and said base structure and between the upper ends of said link arms and said beam structure, one of said bearing pivots comprising a first pivotal member carrying a tubular bushing, a second pivotal member carrying tubular nipples aligned with the ends of said tubular bushing, closure caps closing the outer ends of said tubular nipples, and a pivot pin extending through said tubular bushing and into said tubular nipples, said pivot pin having a loose rotative fit therein whereby said pin is free to rotate during the vibratory period of said vibrator head so as to present new or changing peripheral surfaces to the lines of shear transmitted through said bearing pivot.

References Cited in the file of this patent

UNITED STATES PATENTS

| | | |
|---|---|---|
| 1,818,470 | Frazee | Aug. 11, 1931 |
| 1,932,520 | Horsch | Oct. 31, 1933 |
| 1,970,740 | Day | Aug. 21, 1934 |
| 2,656,058 | Foote | Oct. 20, 1953 |
| 2,673,651 | Plant | Mar. 30, 1954 |
| 2,698,102 | Yeager | Dec. 28, 1954 |
| 2,818,184 | Matson | Dec. 31, 1957 |

FOREIGN PATENTS

| | | |
|---|---|---|
| 459,899 | Great Britain | Jan. 18, 1937 |